United States Patent [19]
Fischenich et al.

[11] Patent Number: 5,335,585
[45] Date of Patent: Aug. 9, 1994

[54] MASTER CYLINDER

[75] Inventors: Bernhard Fischenich; Eckhart Rudiger, both of Ebern; Herbert Sauer, Pfarrweisach, all of Fed. Rep. of Germany

[73] Assignee: Fahrzeugtechnik Ebern GmbH, Fed. Rep. of Germany

[21] Appl. No.: 19,610

[22] Filed: Feb. 19, 1993

[30] Foreign Application Priority Data

Apr. 10, 1992 [DE] Fed. Rep. of Germany ....... 4212107

[51] Int. Cl.⁵ .................................... F01B 29/00
[52] U.S. Cl. .................................... 92/128; 92/188
[58] Field of Search ............... 92/140, 187, 188, 128; 60/586, 587, 588; 403/143

[56] References Cited

U.S. PATENT DOCUMENTS

| | | | |
|---|---|---|---|
| 2,074,719 | 3/1937 | Carroll | 60/587 |
| 2,098,653 | 11/1937 | Carroll | 60/587 |

FOREIGN PATENT DOCUMENTS

| | | | |
|---|---|---|---|
| 959138 | 5/1964 | United Kingdom | 60/588 |
| 2030638 | 4/1980 | United Kingdom | 403/143 |

Primary Examiner—Edward K. Look
Assistant Examiner—F. Daniel Lopez
Attorney, Agent, or Firm—Ostrolenk, Faber, Gerb & Soffen

[57] ABSTRACT

A master cylinder for use on a hydraulically actuated clutch or brake system of a motor vehicle, or for the like uses. The master cylinder comprises a cylindrical housing, and a piston which is axially displaceable along the housing, a piston rod in the housing. The piston rod is connected with the piston to be movable together free of play, but they are swingable with respect to each other, whereby the piston rod may swing with respect to the piston in the housing. The connection between the piston and the piston rod comprises a generally ball shaped head on the piston rod, which is held between partial shells in the housing which are shaped to partially surround and form lock to the piston rod head. The piston has a neck with receiving grooves in it. The partial shells have projections which engage in the grooves in the neck. A tubular piston-shaft sleeve in the housing is axially shiftable in the housing and is fastened to the piston. The piston neck, the piston rod ball and the partial shells are in the tubular piston-shaft sleeve.

16 Claims, 2 Drawing Sheets

MASTER CYLINDER

BACKGROUND OF THE INVENTION

The present invention relates to a master cylinder for a vehicle hydraulic brake or clutch system and particularly to the retention of the piston thereof.

An hydraulically actuated clutch or brake system of a motor vehicle requires that the master cylinder, which is actuated by the brake pedal, also take up rearwardly directed forces which occur, for instance, when the driver rapidly releases the pedal and the pedal, acted on by the return spring, returns rapidly into its starting position or when, by mistake, the foot of the driver is below the pedal and "pulls" up on it. These forces can become very large as a result of the leverage. Furthermore, the rearward stop limitation should be effected in an easily installed, cost favorable, play free manner in the case of short master cylinders.

Federal Republic of Germany OS 31 49 628 discloses a master cylinder in which a push rod, which is provided with a spherical head, is fastened swingably via a holding member in the bore of a piston. In this connection, the holding element has a plurality of resilient projections. Some projections engage behind the push rod head while the others rest with initial stress against and therefore grab the wall of the housing bore. This force locked connection permits only a limited rearward stopping force. Therefore, the piston rod is provided with an extension which comes against a stop disk which is secured by a snap ring in the housing. This complicated construction is expensive and is time consuming to install.

SUMMARY OF THE INVENTION

The object of the present invention is to develop a master cylinder of the aforementioned type having a rearward stop limitation, which master cylinder is easy to install, is of favorable cost and which can be obtained with simple means.

The invention concerns a master cylinder for use on a hydraulically actuated clutch or brake system of a motor vehicle, or for the like uses. The master cylinder comprises a cylindrical housing, a piston which is axially displaceable along the housing, and a piston rod in the housing. The piston rod is connected with the piston to be movable together with the piston free of play, but they are swingable with respect to each other, whereby the piston rod may swing with respect to the piston in the housing. The connection between the piston and the piston rod comprises a profiled head, particularly generally ball shaped head on the piston rod, which is held between partial shells in the housing which are matingly shaped to partially surround and form lock to the piston rod head. The piston has a neck with receiving grooves in it. The partial shells have projections which engage in the grooves in the neck so that the shells move together with the piston and take the piston rod with the shells. A tubular piston-shaft sleeve in the housing is axially shiftable in the housing and is fastened to the piston. The piston neck, the piston rod ball and the partial shells are in the tubular piston-shaft sleeve.

The ball shaped head of the piston rod and the piston are surrounded by two half shells. After installation of the piston shaft sleeve around the half shells, the piston and the two half shells are inseparably connected. By the structural development of the undercut on the piston and by knobs on the two half shells, the connection between the piston rod ball and the piston socket is free of play upon the installation of the structural group comprised of the piston, the piston rod and the two half shells into the piston shaft sleeve.

The outer bushing (shank piston receiver) includes resilient segments which rest in recesses in the master housing and provides a simple, process reliable and inexpensive method for supporting the rearward forces which occur.

Other objects and features of the invention are explained with reference to the accompanying drawings.

DETAILED DESCRIPTION OF THE INVENTION

Figure 1:
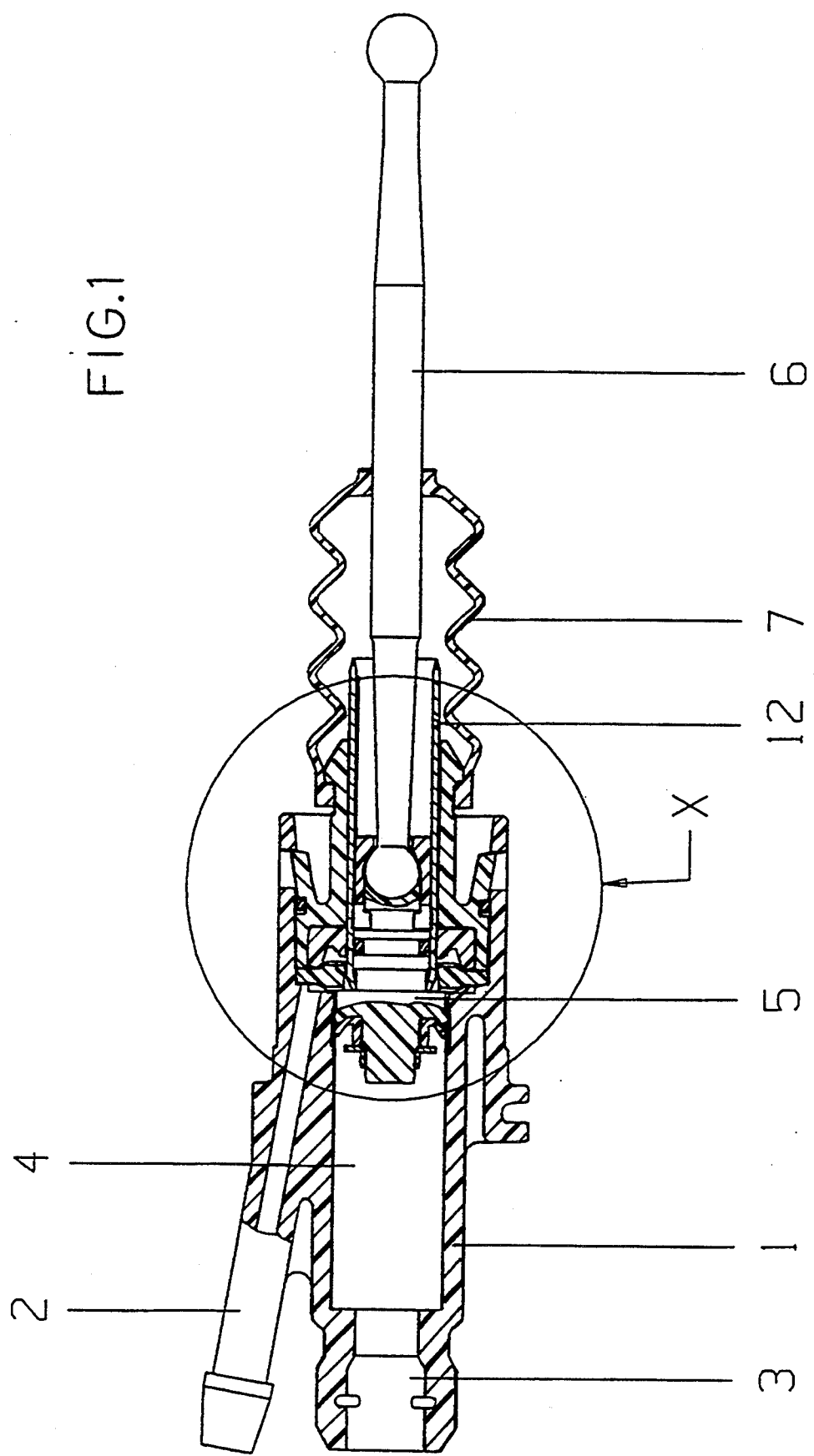
FIG. 1 is a section through a master cylinder according to the invention.
Figure 2:
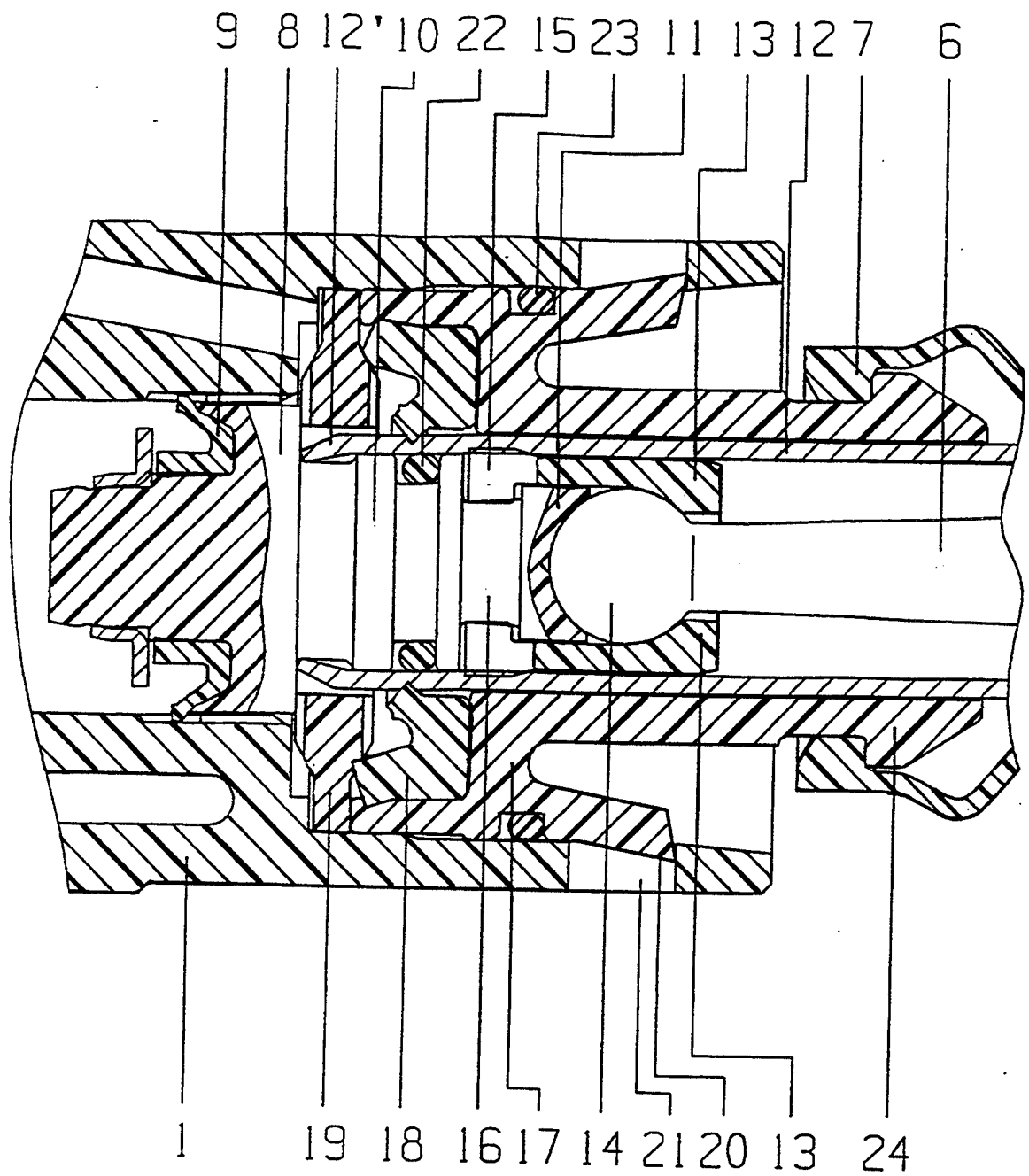
FIG. 2 shows the detail X of FIG. 1 on a larger scale.

In FIGS. 1 and 2, the master cylinder has a housing 1 which is preferably injection molded. The housing has a connection 2 for pressure liquid and a connection 3 for forwarding pressure liquid to a slave cylinder (not shown). Within the cylinder bore 4 there is a piston 5 which is axially displaceable by a piston rod 6. A surrounding bellows 7 protects against entry of dirt past the piston rod. The piston 5 includes a piston head 8 with packing 9 around it for sealing in the bore. The piston head extends out of a piston neck 10. At the other end of the piston, there is a shaped socket, particularly a ball socket 11, which is surrounded by a tubular piston shank sleeve 12.

Two piston head enclosing and particularly ball shape enclosing partial shells and particularly half shells 13 with complementary spherically rounded interiors partially surround the ball or spherical head 14 on the piston rod. The spherical half shells 13 in the piston shank sleeve 12 have projections 15 which extend to and engage into a groove 16 around the piston neck 10. This connects the piston rod ball 14 in a form locked and play free manner to the piston 5. However, the ball connection between the rod 6 and the piston 5 permits the rod to swing with respect to the piston.

The piston shank sleeve 12 is comprised of steel or aluminum. It is axially displaceable in a guide bushing 17 comprised of plastic. This results in a good relative sliding pair so that the sleeve 12 may slide in the bushing 17. The guide bushing 17 receives a seal packing 18 on its front end, which also cooperates with a support disk 19 in the housing. For axially fixing it in the housing 1, the guide bushing 17 is provided on its outer wall with radially elastic snap noses 20 which engage in housing recesses 21. This permits inexpensive mounting of the bushing.

To assemble this cylinder, the two spherical half shells 13 are first positioned surrounding the piston rod ball 14, and their projections 15 extend into the groove 16 of the piston neck 10. The O-ring 22 has already been arranged on the piston 5. The piston shank sleeve 12 is next pushed over the half shells 13, which connects the piston rod 6 in a form locked manner with the piston 5. As a safety measure, the end 12' of the piston shank sleeve 12 which faces the piston can furthermore be bent into and flanged into a groove in the piston 5. This ensures that the piston 5 and the sleeve 12 move axially together. The piston assembly thus produced is inserted into the housing 1 of the master cylinder. Then the support disk 19 is inserted into the housing. The guide bushing 17 provided with the packing 18 and the O-ring 23 is placed over the piston shank sleeve 12 and is pushed axially into the housing 1 until the snap noses 20 engage in the housing recesses 21. After the bellows 7 has been pushed over the guide sleeve extension 24, the master cylinder is assembled.

Although the present invention has been described in relation to a particular embodiment, many other variations and modifications and other uses will become apparent to those skilled in the art. It is preferred, therefore, that the present invention be limited not by the specific disclosure herein, but only by the appended claims.

What is claimed is:

1. A master cylinder for use on a hydraulically actuated clutch or brake system of a motor vehicle, or for the like uses, comprising:
   a housing with a tubular opening;
   a tubular piston-shaft sleeve in the housing opening and axially shiftable therealong;
   a piston which is disposed in the piston-shaft sleeve to be axially displaceable with the sleeve along the housing opening;
   a piston rod in the housing opening, movable forward in a working stroke relative to said housing and movable rearward in a return stroke relative to said housing;
   means connecting the piston rod with the piston to be movable together and be free of play, but being swingable with respect to each other, whereby the piston rod may swing with respect to the piston in the sleeve; the connecting means between the piston and the piston rod comprising:
   a generally ball shaped head on the piston rod;
   two partial shells in the piston-shaft sleeve and shaped to partially surround the piston rod head, and being so shaped that the partial shells in the sleeve are form locked on the head;
   the piston having a rearward projecting neck with receiving grooves in it and the partial shells having projections which extend to and engage in the grooves in the neck whereby the piston and the partial shells move together through the sleeve while the latter is being assembled with said piston.

2. The master cylinder according to claim 1, further comprising a guide bushing in the housing radially between the housing and the piston shaft sleeve being outside of the latter, for guiding the movement of the piston shaft sleeve in the housing, by acting as a slide bearing for said sleeve as the latter moves in unison with said piston; means on the bushing for engaging the housing to retain the bushing axially in the housing.

3. The master cylinder of claim 2, wherein the means on the bushing for engaging the housing comprise elastic snap noses on the exterior of the bushing, and cooperating recesses in the housing in which the noses project for holding the bushing to the housing as the piston shaft sleeve shifts in the bushing.

4. The master cylinder of claim 3, further comprising a support disk in the housing and engaged by the bushing when the noses are in the recesses in the housing; said support disk having an aperture through which said sleeve reciprocates.

5. The master cylinder according to claim 4 in which said bushing blocks rearward movement of said disk and said disk limits rearward movement of said piston.

6. The master cylinder according to claim 2 in which said tubular opening includes a forward section of relatively small cross-section and a relatively large rear section;
   said piston having a main section in front of said neck, said main section being closely fitted in said forward section of said tubular opening and said guide bushing being disposed in said rear section of said tubular opening.

7. The master cylinder according to claim 6 in which said sleeve projects into said forward section of said tubular opening as said main section of said piston moves forward.

8. The master cylinder according to claim 7 in which said sleeve is longer than said guide bushing.

9. The master cylinder according to claim 2 in which said piston, said piston rod, said sleeve and said connecting means are interconnected to form portions of a subassembly that is separable from and operatively joinable with said housing as a single unit.

10. The master cylinder of claim 9, wherein the means on the bushing for engaging the housing comprises elastic snap noses on the exterior of the bushing, and cooperating recesses in the housing in which the noses project for holding the bushing to the housing as the piston shaft sleeve shifts in the bushing.

11. The master cylinder of claim 10, further comprising a support disk in the housing and engaged by the bushing when the noses are in the recesses in the housing; said support disk having an aperture through which said sleeve reciprocates.

12. The master cylinder according to claim 11 in which said bushing blocks rearward movement of said disk and said disk limits rearward movement of said piston.

13. The master cylinder of claim 1, wherein the two partial shells are half shells and the interiors thereof are each essentially spherically curved.

14. The master cylinder of claim 1, further comprising a pressure liquid inlet connected with the housing for delivering pressure liquid to the side of a piston away from the piston rod; and a pressure liquid outlet from the housing also communicating with the same side of the piston as the pressure liquid inlet.

15. A master cylinder for use on a hydraulically actuated clutch or brake system of a motor vehicle, or for the like uses, comprising:
   a housing with a tubular opening;
   a tubular piston-shaft sleeve in the housing opening and axially shiftable therealong;
   a piston which is disposed in the piston-shaft sleeve to be axially displaceable with the sleeve along the housing opening;
   a piston rod in the housing opening;
   means connecting the piston rod with the piston to be movable together and be free of play; the connecting means between the piston and the piston rod comprising:
   a shaped head on the piston rod;
   two partial shells in the piston-shaft sleeve and shaped to partially surround the shaped piston rod head, and being so shaped that the partial shells in the housing are form locked on the head;
   the piston having a neck; means on the neck and on the partial shells for engagement, whereby the piston and the partial shells move together through the sleeve while the latter is being assembled with said piston.

16. The master cylinder according to claim 15 in which said piston, said piston rod, said sleeve and said connecting means are interconnected to form portions of a subassembly that is separable from and operatively joinable with said housing as a single unit.

* * * * *